United States Patent
Northup et al.

(10) Patent No.: US 10,540,292 B2
(45) Date of Patent: Jan. 21, 2020

(54) TLB SHOOTDOWNS FOR LOW OVERHEAD

(71) Applicant: Google Inc., Mountain View, CA (US)

(72) Inventors: Eric Northup, Seattle, WA (US); Benjamin Charles Serebrin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 23 days.

(21) Appl. No.: 15/616,486

(22) Filed: Jun. 7, 2017

(65) Prior Publication Data

US 2017/0357595 A1    Dec. 14, 2017

Related U.S. Application Data

(60) Provisional application No. 62/347,495, filed on Jun. 8, 2016.

(51) Int. Cl.
*G06F 12/10* (2016.01)
*G06F 12/1027* (2016.01)
*G06F 12/1009* (2016.01)

(52) U.S. Cl.
CPC ...... *G06F 12/1027* (2013.01); *G06F 12/1009* (2013.01); *G06F 2212/65* (2013.01); *G06F 2212/68* (2013.01)

(58) Field of Classification Search
CPC ............. G06F 12/1027; G06F 12/1009; G06F 2212/65; G06F 2212/68
See application file for complete search history.

(56) References Cited

U.S. PATENT DOCUMENTS 5,890,217 A    3/1999 Kabemoto et al.
5,906,001 A *  5/1999 Wu .................... G06F 12/1036
                                                  711/141

(Continued)

FOREIGN PATENT DOCUMENTS

EP    1555618 A2    7/2005
JP    S63-286944 A  11/1988
(Continued)

OTHER PUBLICATIONS

International Conference on Parallel Architectures and Compilation Techniques (PACT), 2011, IEEE, Villavieja et al, "DiDi: Mitigating the Performance Impact of TLB Shootdowns Using Shared TLB Directory", ISBN 978-1-4577-1794-9; ISBN 1-4577-1794-8. 10 pages.

(Continued)

*Primary Examiner* — Ryan Bertram
(74) *Attorney, Agent, or Firm* — Lerner, David, Littenberg, Krumholz & Mentlik, LLP (57) ABSTRACT

Aspects of the disclosure relate to directing and tracking translation lookaside buffer (TLB) shootdowns within hardware. One or more processors, comprising one or more processor cores, may determine that a process executing on a processing core causes one or more virtual memory pages to become disassociated with one or more previously associated physical memory addresses. The processing core which is executing that process which caused the disassociation may generate a TLB shootdown request. The processing core may transmit the TLB shootdown request to the other cores. The TLB shootdown request may include identification information, a shootdown address indicating the disassociated virtual memory page or pages which need to be flushed from the respective TLBs of the other cores, and a notification address indicating where the other cores may acknowledge completion of the TLB shootdown request.

17 Claims, 5 Drawing Sheets

(56) References Cited

U.S. PATENT DOCUMENTS

| | | | |
|---|---|---|---|
| 5,928,353 A | 7/1999 | Yamada | |
| 2006/0026359 A1* | 2/2006 | Ross | G06F 12/1027 711/133 |
| 2006/0259732 A1* | 11/2006 | Traut | G06F 12/109 711/173 |
| 2007/0061548 A1 | 3/2007 | Jordan et al. | |
| 2007/0204074 A1 | 8/2007 | Ishida et al. | |
| 2010/0031071 A1* | 2/2010 | Lu | G06F 1/3203 713/323 |
| 2013/0031333 A1 | 1/2013 | Sankaran et al. | |
| 2014/0075151 A1* | 3/2014 | Cain, III | G06F 12/1027 711/207 |
| 2014/0115297 A1* | 4/2014 | Cain, III | G06F 12/1027 711/207 |
| 2014/0189285 A1* | 7/2014 | Conrad | G06F 12/1027 711/207 |
| 2015/0100753 A1 | 4/2015 | Shen et al. | |
| 2015/0134931 A1* | 5/2015 | Mukherjee | G06F 9/461 712/30 |
| 2015/0242319 A1* | 8/2015 | Evans | G06F 12/1045 711/207 |
| 2016/0041922 A1* | 2/2016 | Parks | G06F 12/1027 711/207 |
| 2016/0140047 A1* | 5/2016 | Mukherjee | G06F 12/1027 711/207 |
| 2016/0140051 A1* | 5/2016 | Kessler | G06F 12/1045 711/119 |
| 2017/0277639 A1 | 9/2017 | Awad et al. | |

FOREIGN PATENT DOCUMENTS

| | | |
|---|---|---|
| JP | H01-109452 A | 4/1989 |
| JP | 2004326798 A | 11/2004 |
| JP | 2006209797 A | 8/2006 |
| JP | 2007233522 A | 9/2007 |
| JP | 2014526102 A | 10/2014 |
| JP | 2017156780 A | 9/2017 |
| WO | 9827493 A1 | 6/1998 |
| WO | 2013147885 A1 | 10/2013 |
| WO | 2015124899 A1 | 8/2015 |

OTHER PUBLICATIONS

Combined Search and Examination Report for UK Patent Application No. GB1621246.6, dated May 31, 2017. 7 pages.

Extended European Search Report for European Patent Application No. 16204029.9, dated Jun. 20, 2017. 10 pages.

Office Action for Japanese Patent Application No. 2016-246448 dated Oct. 3, 2017.

Oskin, et al. "A Software-managed Approach to Die-stacked DRAM," (2015) 13 pages.

ARM Limited or its affiliates "ARM® v8-M Architecture Reference Manual" (2015) 648 pages.(Part 1).

ARM Limited or its affiliates "ARM® 8-M Architecture Reference Manual" (2015) 716 pages.(Part 2).

Extended European Search Report for European Patent Application No. 19151501.4, dated Mar. 15, 2019. 10 pages.

Examination Report for United Kingdom Patent Application No. 1621246.6 dated Sep. 18, 2019. 4 pages.

Office Action for Japanese Patent Application No. 2018-146132 dated Oct. 29, 2019.

* cited by examiner

[Omitted header: US 10,540,292 B2]

TLB SHOOTDOWNS FOR LOW OVERHEAD

CROSS-REFERENCE TO RELATED APPLICATION

The present application claims the benefit of the filing date of U.S. Provisional Patent Application No. 62/347,495 filed Jun. 8, 2016, the disclosure of which is hereby incorporated herein by reference.

BACKGROUND

The proliferation of multicore processors and virtual processors has led to the increased use of virtual memory. Virtual memory provides the illusion of a contiguous section of memory to each process operating on the processors of a system, but the actual physical memory used by each process may be spread across a system's physical memory. In this regard, virtual memory is typically split into pages, with each page being mapped to a location of the system's physical memory. A page table may be used to map the virtual memory page of a piece of data to the corresponding physical address where the data is stored. In order to increase the speed of converting virtual memory pages to corresponding physical addresses, each core of a processor may implement a translation lookaside buffer (TLB) which stores recent translations of virtual memory pages to physical memory addresses.

When a virtual memory page mapping is modified in a page table, or when hypervisors unmap or otherwise modify a guest page from a virtual machine's virtual memory, the TLB for each processing core needs to be updated accordingly. In some scenarios this is accomplished by sending an interrupt, known as a TLB shootdown interrupt, which instructs each targeted processor core to review a software-defined list of unmapped virtual memory page entries, and to remove these entries from their respective TLB. The targeted processor cores may remove the unmapped entry from their respective TLB tables, and signal their completion to the initiating processor of the TLB shootdown. The OS software on the initiating processor must wait until all responses have returned before further processing may be resumed. Similarly, a receiving processor core must complete the TLB shootdown request before resuming further processing.

In a virtualized environment, sending and receiving interrupts, such as TLB shootdown requests, may be time-consuming as communication between physical processors and virtual processors requires the intervention of the hypervisor. Further, virtual processors may be offline (e.g., descheduled by the hypervisor or the physical CPU may be halted), thereby causing the TLB shootdown acknowledgement from those virtual processors to be delayed. In systems with a large number of virtual processors these delays may increase, sometimes super-linearly, resulting in significant performance reductions.

SUMMARY

Various embodiments within the disclosure relate generally to processing TLB shootdown requests. One aspect includes a method for directing and tracking TLB shootdowns within hardware. In this regard, one or more processors, comprising one or more processor cores, may determine that a process executing on a processing core causes one or more virtual memory pages to become disassociated with one or more previously associated physical memory addresses. The processing core which is executing that process which caused the disassociation may generate a TLB shootdown request. The processing core may transmit the TLB shootdown request to the other cores. The TLB shootdown request may include identification information, a shootdown address indicating the disassociated virtual memory page or pages which need to be flushed from the respective TLBs of the other cores, and a notification address indicating where the other cores may acknowledge completion of the TLB shootdown request.

In some examples, the method may further include receiving acknowledgments from the other cores, upon their completion of the TLB shootdown request. The acknowledgements may be received at the notification address. The one or more processors may execute one or more virtual machines, wherein the virtual machines include one or more virtual computer processors. The process may be a first process executing in the one or more virtual machines.

In some examples, the method may further include determining, by a power management unit, whether a first core which received the TLB shootdown request is in a low power state, and in the event the first core is in a low power state acknowledging the TLB shootdown request by the power management unit.

Another aspect includes a system for directing and tracking TLB shootdowns within hardware. The system may comprise one or more computing devices having one or more processors comprising one or more cores. In this regard, the one or more processors may be configured to determine that a process executing on one of the one or more processing cores causes one or more virtual memory pages to become disassociated with one or more previously associated physical memory addresses. The processing core that is executing the process which caused the disassociation may be configured to generate a TLB shootdown request. The processing core may be further configured to transmit the TLB shootdown request to the other cores. The TLB shootdown request may include identification information, a shootdown address indicating the disassociated virtual memory page or pages which need to be flushed from the respective TLBs of the other cores, and a notification address indicating where the other cores may acknowledge completion of the TLB shootdown request.

BRIEF DESCRIPTION OF THE DRAWINGS

The present technology is illustrated by way of example, and not by way of limitation, in the figures of the accompanying drawings in which like reference numerals refer to similar elements including.

DETAILED DESCRIPTION

Overview

The technology relates to a system, method, and computer-readable medium for efficiently processing translation lookaside buffer (TLB) shootdowns. In conventional multi-core processor and virtual machine (VM) environments, TLB shootdowns are transmitted from a first core and received by every other core (or a subset of cores) on a processor. Every receiving core then needs to review its respective TLB to determine whether the TLB contains the virtual page or pages which the TLB shootdown indicates as needing removal. Upon determining that the TLB shootdown was a success, or not necessary, the receiving cores need to individually acknowledge completion of the TLB shootdown to the transmitting core. This may be a time and resource intensive process, especially when the TLB shootdown is initiated by a process instance in a virtual machine whereby communication through multiple layers of software may significantly delay further processing by all of the cores.

According to the present disclosure, the processing resources needed to complete TLB shootdowns may be reduced by using full hardware implementation to direct and track TLB shootdowns to only those cores which are associated with a TLB that likely requires removal of the virtual memory page or pages. For instance, when a process executing on one or more processing cores causes one or more virtual memory pages to become disassociated with one or more previously associated physical memory addresses, a TLB shootdown request may be generated by the core which caused the disassociation. The TLB shootdown request may include identification information which allows each of the receiving cores to quickly determine whether a shootdown is necessary, a shootdown address which indicates the virtual memory page or pages which need to be flushed from the respective TLBs, and a notification address which indicates where the receiving cores may acknowledge completion of the TLB shootdown request.

The identification information may include an identifier for each VM, each VCPU within the VMs, each processor core, and each process executed within a VCPU and/or processor core may have an identifier. In certain embodiments, such as within an x86 system the identification information may include one or more advanced programmable interrupt controller IDs (APICIDs), a virtual processor ID (VPID), and a process-context identifier (PCID). APICIDs may be tracked and provided by a software application, such as an operating system. For instance, each core of a system may be assigned an APICID by an operating system or by the hardware itself. The operating system may track which cores are executing a particular process and determine the APICIDs of those cores. In the event the process is operating on a virtual machine (VM), the operating system may use a table to map the virtual processors (VCPUs) of the VM, which are executing the particular process, to the physical core or cores which are executing the VM. The APICIDs may be those physical core or cores which are executing the VM.

Virtual processor IDs may be assigned to both logical processors of a VM and to physical cores. For example, when the process is executing outside a VM, that physical core may be assigned a VPID value of 0. In the event the process is operating in a VM, the hypervisor controlling the VM may assign the VPID value.

A process-context identifier (PCID) may be assigned to every process which is executed. In this regard, the PCIDs of each process may be assigned to particular TLB entries associated with a respective process. For the process which requested the TLB shootdown request, the PCID may be determined. Together the APICIDs, VPID, and PCID associated with the process which requested the TLB shootdown may be considered the identification information.

A TLB shootdown request may be transmitted to all of the cores operating on the system. As described herein, the TLB shootdown request may include the identification information, a shootdown address, and a notification address.

For each core which receives the TLB shootdown request, a comparison may be made between the receiving core's identification information and the identification information contained in the TLB shootdown request. In this regard, if the receiving core's identification information does not match the identification information contained in the TLB shootdown request, the TLB shootdown request may be ignored, by a hardware mechanism and without affecting the execution of the CPU's instruction stream. Otherwise, the receiving core may review its respective TLB to determine whether it contains the shootdown address, and if so, it will invalidate that address. Upon completion of the invalidation, or if the shootdown address is not within the receiving core's TLB, or if the invalidation is ignored, the receiving core may transmit an invalidation acknowledgement to the notification address and resume its normal functions, such as continuing to process applications.

The transmitting core may track the number of acknowledgements received from the receiving cores. In this regard, the transmitting core may track the number of acknowledgements received at the notification address until all of the receiving cores which it expects to acknowledge the TLB shootdown request, do so. In some embodiments the transmitting core may continue operation as soon as it sends the TLB shootdown request. To monitor the status of the TLB shootdown request, software, such as the operating system may assure that all acknowledgements have been received.

The features described herein may allow a system to more efficiently process TLB shootdown requests. In that regard, TLB shootdown requests may be ignored by processor cores which are not executing a process which caused the TLB shootdown. Additionally, the processor core which transmitted the TLB shootdown may receive acknowledgements that the TLB shootdown was completed or not need to track acknowledgements at all, allowing for the processor core which transmitted the TLB shootdown to continue other operations more quickly.

Example Systems

Figure 1:
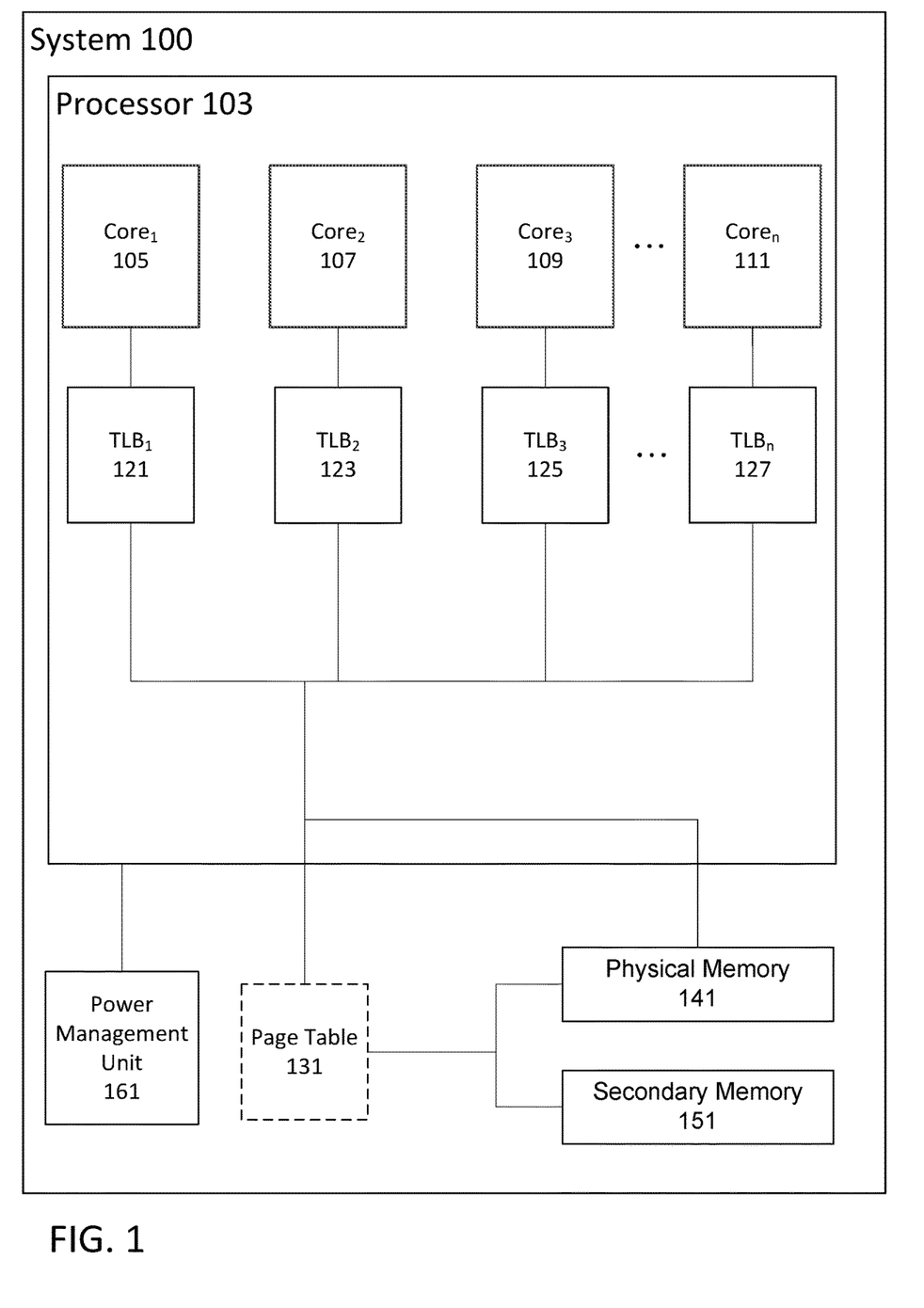
FIG. 1 shows a system in accordance with aspects of the disclosure.

FIG. 1 illustrates a system 100 where TLB shootdowns may be performed. In this regard, the system includes at least one processor 103. The system 100 also includes a page table 131 physical memory 141, secondary memory 151, and a power management unit 161.

Physical memory 141 and secondary memory 151 can store information accessible by the one or more processors 103, including instructions (not shown) that can be executed by the processor 103. The physical and secondary memory can also include data (not shown) that can be retrieved, manipulated or stored by the processor 103. The physical and secondary memory can be of any non-transitory type capable of storing information accessible by the processor, such as a hard-drive, memory card, ROM, RAM, DVD, CD-ROM, write-capable, and read-only memories.

The instructions stored within the physical and secondary memory can be any set of instructions to be executed directly, such as machine code, or indirectly, such as scripts, by the processor. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

The data stored within the physical and secondary memory may be retrieved, stored, and modified by the processor 103 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The processor 103 may be any conventional processor, such as processors from Intel Corporation or Advanced Micro Devices. Alternatively, the processor may be a dedicated controller such as an application specific integrated circuit (ASIC), field programmable gate array (FPGA), etc. Additionally, the processor 103 may include multiple processors, multi-core processors, or a combination thereof. Although only one processor 103 is shown in FIG. 1, one of ordinary skill in the art would recognize that several processors may exist within the system 100. Accordingly, references to a processor will be understood to include references to a collection of processors or dedicated logic that may or may not operate in parallel.

The processor 103 may include one or more cores 105-111. Each core may execute program instructions independently of the other cores thereby enabling multiprocessing. Although not shown, each core may contain a cache, or a single cache may be associated with all of the cores.

The system also includes at least one page table 131. The page table 131 may be used to map the virtual memory page of a piece of data cached within the processor 103 to the corresponding physical address where the data is stored, such as in the physical memory 141 or secondary memory 151. Although the page table 131 is shown outside of the processor 103, the page table 131 may be stored within the cache of the processor 103 or in physical 141 or secondary memory 151.

In order to increase the speed of converting virtual memory pages to corresponding physical addresses, each core 105-111 of a processor may include a translation lookaside buffer (TLB) 121-127 which stores recent translations of virtual memory pages to physical memory addresses.

The system 100 may include a power management unit 161. The power management unit may track the power state of each core within the processor 103. Such states may include an "on" state, an "off" state, or ranges of power states in between the "on" and "off" state. As described in detail below, the power management unit may be programmed to communicate on behalf of each core.

Figure 2:
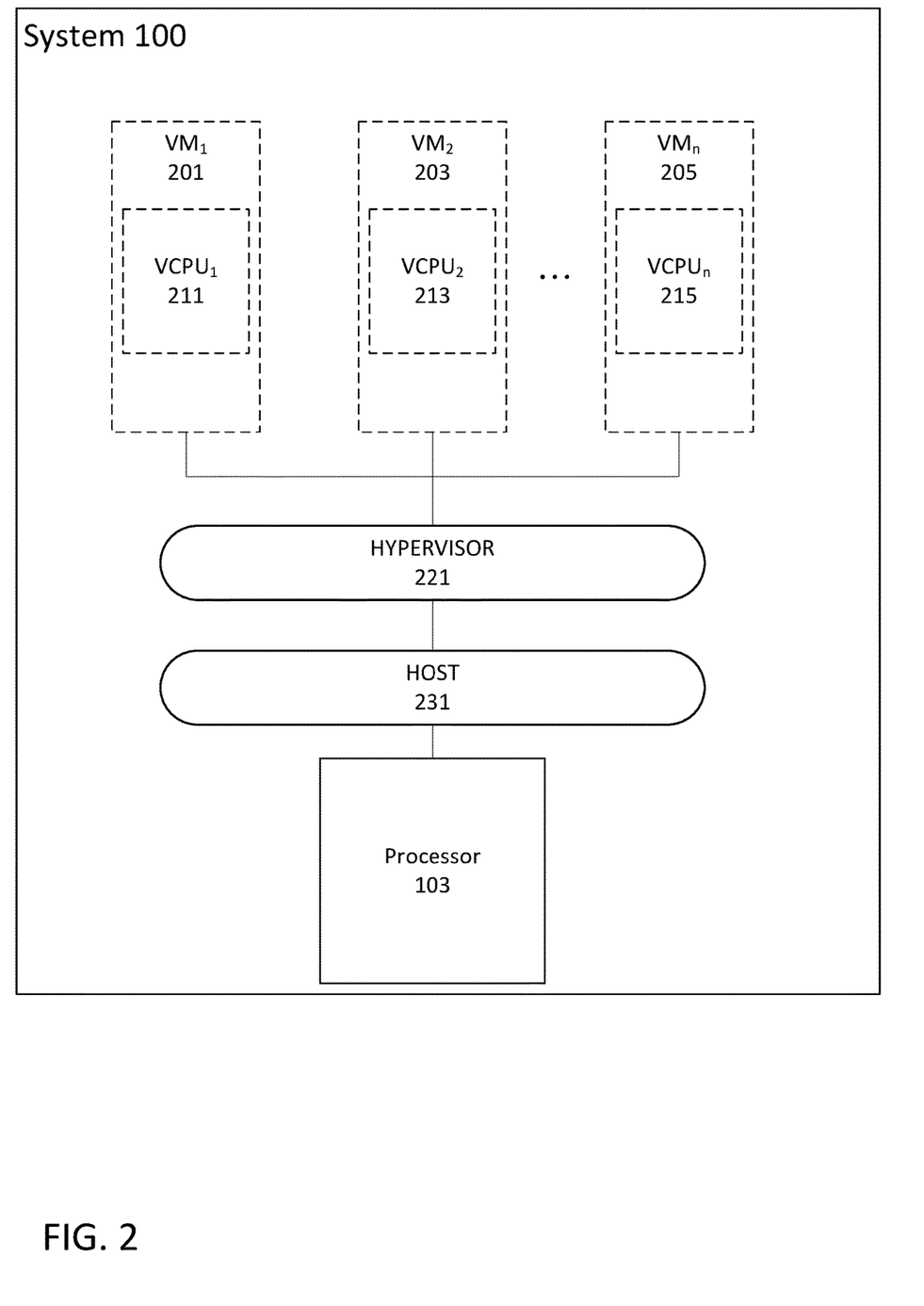
FIG. 2 shows a system executing multiple virtual machines in accordance with aspects of the disclosure.

As illustrated in FIG. 2, the system 100 may be configured to operate one or more virtual machines (VMs) 201-205. In this regard, a hypervisor 221 may be installed on a host 231 which is executed on the processor 103. In operation, the host 231 may run an operating system which includes a hypervisor, such as hypervisor 231, or a virtual machine manager (VMM). In some embodiments the hypervisor 221 may operate directly on the processor 103 without a host 231. For the purposes of this application, hypervisor and VMM may be used interchangeably. Further, one of ordinary skill in the art would recognize that the operating system of the host 231 may be Linux, Windows™, or any other suitable operating system capable of supporting virtual machines.

The hypervisor may manage each VM such that the VMs appear to be isolated from one another. That is, each VM 201, 203, and 205 may believe itself to be an independent machine with its own hardware resources. In this regard, the hypervisor 221 may control the VMs access to the system's 100 resources (i.e. memory, network interface controller, etc.). The hypervisor 221 may implement a hardware virtualization scheme that allocates hardware resources to the VMs as necessary. According to some examples, processor 103 is one of the hardware resources with which VMs 201, 203, and 205 interact via the hypervisor 221.

The VMs 201, 203, and 205 are software implementations of a computer. That is, VMs 201, 203, and 205 execute an operating system. While only three VMs are shown in the figures, one of ordinary skill in the art would recognize that any number of VMs may be supported by the system 100. The operating system of the various VMs 201, 203, and 205 may be the same operating system as the host 231, but do not necessarily have to be. Moreover, the operating system of each VM may be different from other VMs. For example, the host 231 may run a Linux-based operating system, while VM 201 may run a Windows™ operating system and the VM 203 may run a Solaris™ operating system. The various combinations of operating systems would be readily apparent to those skilled in the art and are not discussed in greater detail herein. In some embodiments VMs may be nested within other VMs. In this regard, VM 201 may play host to another guest VM.

Each VM may include its own virtual central processing units (VCPUs) 211-215. Although the VMs of FIG. 2 are shown with only a single VCPU, the VMs may include any number of VCPUs. The VCPUs are virtualized processors which are assigned to a physical processor, such as a processor core of processor 103. Each VCPU may have its own unique identification, known as a virtual processor ID (VPID).

Example Methods

Figure 4:
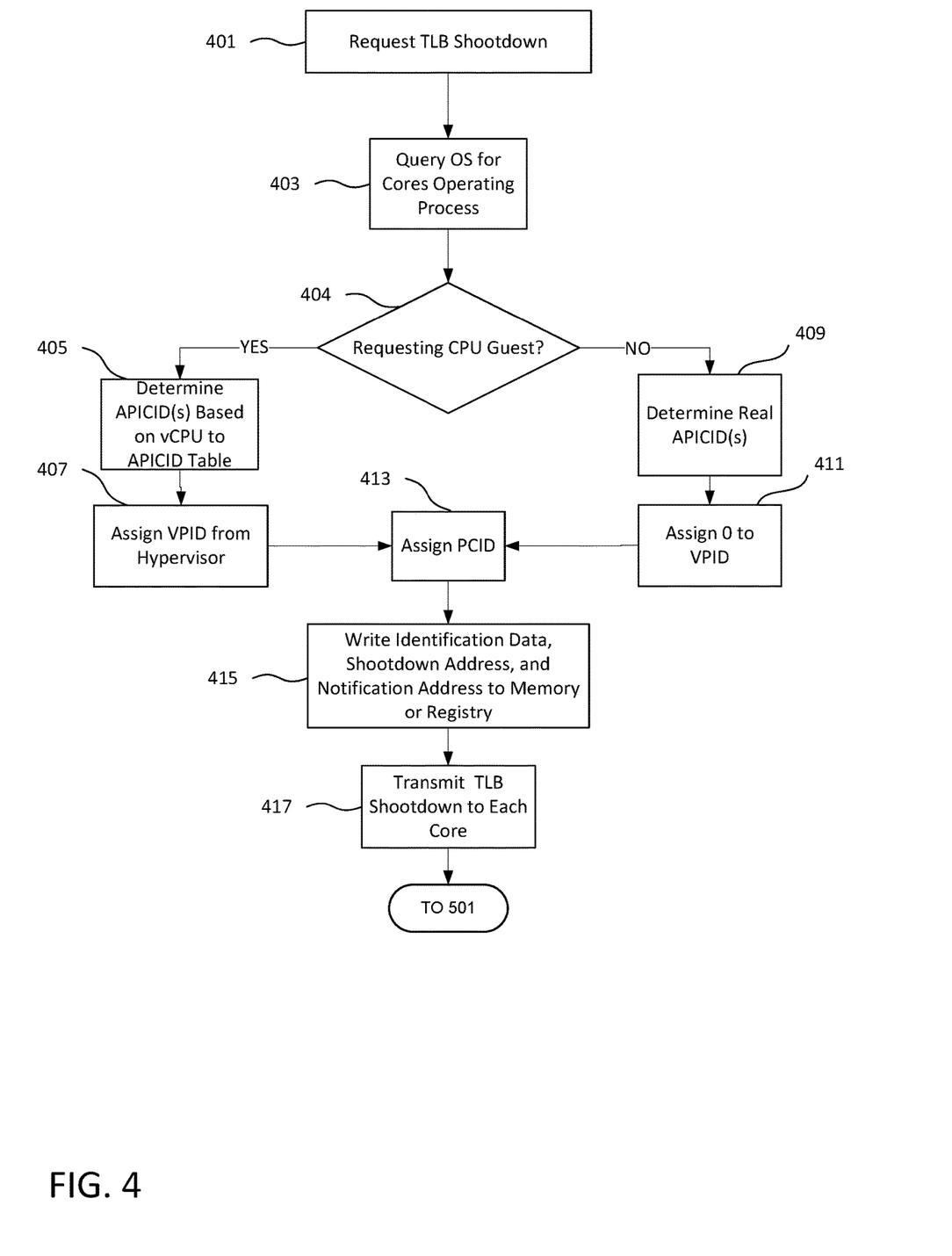
FIG. 4 is a flow diagram in accordance with embodiments of the disclosure.

In order to efficiently process TLB shootdown requests, TLB shootdowns may be reduced by directing and tracking TLB shootdowns to only those cores which are associated with a TLB that likely requires removal of the virtual memory page or pages. For instance, as illustrated in FIG. 4, when a process executing on one or more processing cores causes one or more virtual memory pages to become disassociated with one or more previously associated physical memory addresses, a TLB shootdown request may be generated by the core which caused the disassociation as shown in block 401. As previously described, the TLB shootdown request may include identification information which allows each of the receiving cores to quickly determine whether a shootdown is necessary, a shootdown address which indicates the virtual memory page or pages which need to be flushed from the respective TLBs, and a notification address which indicates where the receiving cores may acknowledge completion of the TLB shootdown request.

The identification information may include an identifier for each VM, each VCPU within the VMs, each processor core, and each process executed within a VCPU and/or processor core may have an identifier. In certain embodiments, such as within an x86 system the identification information may include one or more advanced programmable interrupt controller IDs (APICIDs), a virtual processor ID (VPID), and a process-context identifier (PCID). The APICIDs may be tracked and provided by a software application, such as the host 231 operating system as illustrated in block 403. For example, each core of a system may be assigned an APICID by an operating system, such as the operating system executing on the host 231. The operating system may track which cores are executing a particular process and determine the APICIDs of those cores.

In order to assign the APICIDs to a TLB shootdown request, a determination may be made of whether the process which initiated the request of the TLB shootdown is being executed on a VM (guest) or host (real), as shown in block 404. In the event the process is operating on a VM, the operating system may use a table to map the virtual processors (VCPUs) of the VM, which are executing the particular process, to the physical core or cores which are executing the VM, as shown in block 405. The APICIDs of those physical core or cores which are executing the VM may be assigned as the APICIDs of the TLB shootdown request. In the event the process is not executing in a VM, the APICID will be the real APICIDs which are executing the process, as shown in block 409.

Figure 3:
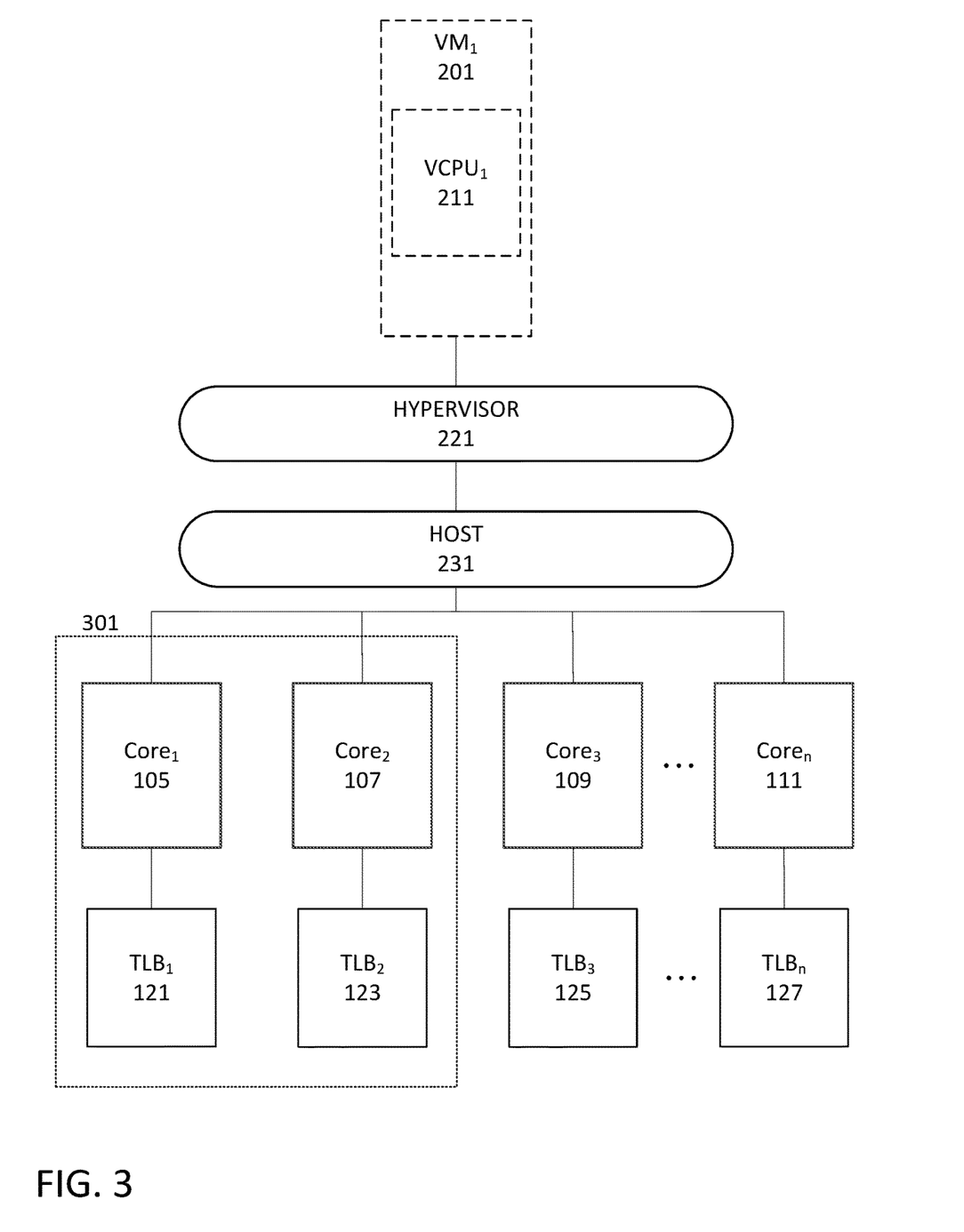
FIG. 3 a system executing a virtual machine on multiple cores in accordance with aspects of the disclosure.

An example of assigning an APICID to a VCPU is shown in FIG. 3. In this regard, VM 201, which includes VCPU 211, may be controlled by hypervisor 221, which is in turn installed on the host operating system 231. The VCPU 211 may be assigned to core 105 of the processor at a first time and assigned to core 107 at another time, as illustrated by box 301. The host operating system 231 may contain a table (not shown) which maps the APICID of VCPU 211 to the APICIDs of processor cores 105 and 107. As such, when a first process executing on VM 201 requests a TLB shootdown, the host operating system may assign the two APICIDs associated with processor cores 105 and 107.

Turning back to FIG. 4, virtual processor IDs may be assigned to both logical processors of a VM and to physical cores. For example, when the process is being executed on a physical core, that physical core may be assigned a VPID value of 0 as shown in block 411. In the event the process is operating on a VM, the hypervisor controlling the VM may assign the VPID value, as shown in block 407. In this regard, the VPID value in the TLB shootdown request of the VCPU's operating within the VM may be ignored, as this VPID value may change as VMs are added or removed from the system 100.

A process-context identifier (PCID) may be assigned to every process which is executed. The process-context identifier provides a unique tag to each process which is executed by a processor, including VCPUs. In this regard, the PCIDs of each process may be assigned to particular TLB entries associated with a respective process. For the process which requested the TLB shootdown request, the PCID may be determined by the processor. Together the APICIDs, VPID, and PCID associated with the process which requested the TLB shootdown may be considered the identification information.

The identification information, shootdown address, and notification address of the TLB shootdown may be written into memory, such as physical memory 141, as a tuple, or may be assigned to registers (not shown) in the processor 103. For example, in the case of an x86 processor architecture, identification information, shootdown address, and notification address of the TLB shootdown may be input into various processor registries, such as the RDX, RAX, RCX, and RDI registers. In one instance the APICIDs may be input into the RDX register and the VPID and PCIDs may be input into the RDI registers via a write to model specific register command (WRMSR).

The RCX register may be encoded to indicate an interrupt command (e.g., the TLB shootdown request) is going to be sent. For example, in a x86 system an existing RCX register value may be 0x830 and RDX may be the destination field (e.g., APICID). The existing RAX values may be as follows: Destination shorthand: 00; Trigger mode: 0; Level: 1; Destination Mode: 0 or 1 to indicate physical or logical. These values may be modified by adding a new encoding to "delivery mode" and "vector". For example, delivery mode=010 (for SMI) and vector is a new nonzero value. Or delivery mode=100 (NMI) and vector is a new nonzero value. This new encoding may indicate that a TLB shootdown is being performed. Additionally, other new values may be in other registers. For example, RDI may contain an extended destination field (e.g., VPID and PCID), RSI may contain the notification address, and RBX contains shootdown address encoding. Other encodings may also be used to indicate that a TLB shootdown is being performed. The values may be input into the RAX register, as well as the other registers, via a write to model specific register command (WRMSR).

The APICID may be encoded to indicate whether the TLB shootdown request will be sent in a logical or physical mode. In this regard, physical mode will require separate TLB shootdown requests for each core in the system. For example, processor 103 contains four cores, one of which is sending the TLB request. As such, three separate shootdown requests will be sent to each of the other three cores. When the APICID is in logical mode, the other three cores will all be sent the same TLB shootdown request.

The shootdown address may be included in the tuple or registry. In this regard, the shootdown address may be encoded into the tuple or registry. For example, the shootdown address may be encoded as one or more of a one page address of a 4 kb page (e.g., an address which matches INVLPG instruction encoding), a start address and number of pages (e.g., encoded as log(num pages) or as (num pages)), or as a list of invalidation addresses.

A TLB shootdown request may be transmitted to all of the cores operating on the system, as shown in block 417. As described, the TLB shootdown request may include the identification information, a shootdown address, and a notification address. In some embodiments, the operating system may direct TLB shootdowns to only those cores which are associated with a TLB that likely requires removal of a virtual memory page or pages. As such, the OS may direct the TLB shootdown to a subset of the cores.

Figure 5:
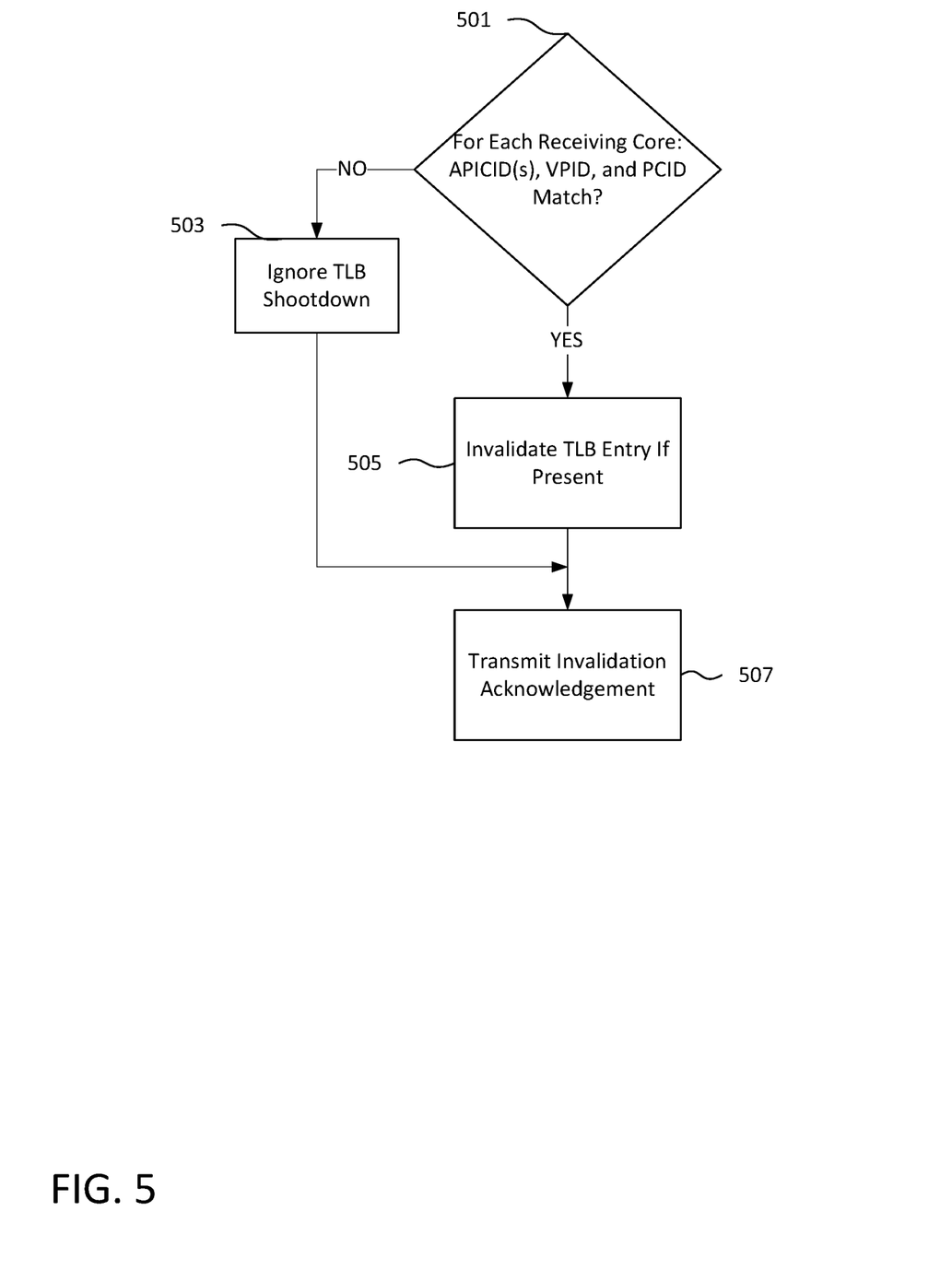
FIG. 5 is a flow diagram in accordance with embodiments of the disclosure.

Turning now to FIG. 5, in each core which receives the TLB shootdown request, a comparison may be made between the receiving core's identification information and the identification information contained in the TLB shootdown request, as shown in block 501. In this regard, if the receiving core's identification information does not match the identification information contained in the TLB shootdown request, the TLB shootdown request may be ignored, as shown in block 503. Otherwise, the receiving core may review its respective TLB to determine whether it contains the shootdown address, and if so, it will invalidate that address, as shown in block 505.

Upon completion of the invalidation, or if the shootdown address is not within the receiving core's TLB, the receiving core may transmit an invalidation acknowledgement to the notification address, as shown in block 507. An acknowledgement may also be sent when the receiving core's identification information does not match the identification information contained in the TLB shootdown request. The receiving core may resume normal functions, such as continuing to process applications upon completing the TLB shootdown. In some examples, acknowledgements may be sent by all cores which receive the TLB shootdown, even from receiving cores which ignore the TLB shootdown. In other examples, only the cores that obey the shootdown will send the acknowledgment.

In some examples, a processor's power management unit may acknowledge completion of a TLB shootdown. In this regard, a core may flush its TLB upon switching to a power state below a certain threshold, such that TLB invalidations to that core have no further effect. If a core receives a TLB shootdown request while in a low power state below the threshold, the power management unit may acknowledge completion of the TLB shootdown request on behalf of the receiving core as the receiving core in the low power state has previously released its entire TLB. By allowing the power management unit to acknowledge completion of the TLB shootdown request, the transmitting core will receive a quicker response to the request than if the transmitting core needed to wait until the receiving core returned to a higher power state. Further, processing by the receiving core may not be interrupted by the TLB shootdown request. In some examples, other components within the system 100, such as an advanced programmable interrupt controller (APIC) (not shown) may be used to communicate on behalf of each core. For example, the APIC may acknowledge completion of a TLB shootdown. Generally, other always-powered hardware agents may be extended or created to perform acknowledgments on behalf of the cores. For example, a VCPU that is not currently running will have no TLB entries associated with it, so a always-powered proxy acknowledgment may allow the completion of the TLB shootdown request without input from the VCPU.

The transmitting core may track the number of acknowledgements received from the receiving cores. In this regard, the transmitting core may track the number of acknowledgements received at the notification address until all of the receiving cores which it expects to acknowledge the TLB shootdown request, do so. For example, based on the APICIDs contained in the TLB shootdown request, the transmitting core may know how many acknowledgements are expected. As such, the transmitting core may monitor the notification address, such as a specific virtual or physical address of a bitvector, until those numbers of acknowledgements are received. In some examples, the transmitting core may continue operation as soon as it sends the TLB shootdown request. To monitor the status of the TLB shootdown request, software, such as the host operating system 231 may assure that all acknowledgements have been received.

Where multiple processors are found within a single system, a socket manager may be assigned to each respective processor. Each respective socket manager may then monitor the acknowledgements from all cores within its processor. The socket manager may then report back to the notification address the acknowledgements which are received. In some embodiments the socket managers may be assigned to more than a single processor. In this regard, socket managers may be assigned to a subregion of a socket, to a circuit board, to a chassis, etc.

A TLB shootdown may be triggered by writing to a cacheline. In this regard, each VCPU may hold a cacheline in a shared-state which is unique per VM, VCPU pair. To initiate a TLB shootdown, the VCPU that is initiating the TLB shootdown may write to this cacheline, resulting in the cacheline being released from its respective cache and triggering a hardware or microcode mechanism that indicates that the core should initiate the TLB shootdown process.

Further, TLB shootdowns may be targeted to only specific cores. In this regard, software may maintain a mapping of all VCPUs/VMs to cores. Based on this mapping, the TLB shootdown may be directed to only those cores which process the process which triggered the TLB shootdown.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for directing and tracking translation lookaside buffer (TLB) shootdowns within hardware comprising:
   detecting, by one or more processors, each processor comprising one or more processor cores, that a process executing on a first processing core causes one or more virtual memory pages to become disassociated with one or more previously associated physical memory addresses;
   generating, by the first processing core, a TLB shootdown request; and
   transmitting, by the first processing core, the TLB shootdown request to others of the one or more processing cores, the TLB shootdown request comprising:
      a shootdown address indicating the disassociated virtual memory page or pages to be flushed from the respective TLBs of the other processing cores,
      a notification address indicating where the other processing cores may acknowledge completion of the TLB shootdown request, and
      identification information, wherein the identification information comprises an identifier for components including one or more advanced programmable interrupt controller IDs (APICIDs), one or more virtual processor IDs (VPIDs), and one or more a process-context identifiers (PCIDs), wherein the components comprise one or more of a virtual machine (VM), a virtual computer processor (VCPU) within the VM, a processor core, and a process executed within a VCPU or processor core.

2. The method of claim 1 further comprising, receiving acknowledgments from the other processing cores upon their completion of the TLB shootdown request, wherein the acknowledgements are received at the notification address.

3. The method of claim 1, wherein the one or more processors execute one or more virtual machines, wherein the virtual machines include one or more virtual computer processors (VCPUs), and the process may be a first process executing in the one or more VCPUs.

4. The method of claim 1, further comprising:
determining, by a power management unit, whether a second core which received the TLB shootdown request is in a low power state, and
in the event the second core is in a low power state, acknowledging the TLB shootdown request by the power management unit.

5. The method of claim 1, further comprising:
determining, by an advanced programmable interrupt controller (APIC), whether a second core which received the TLB shootdown request is in a low power state, and in the event the second core is in a low power state, acknowledging the TLB shootdown request by the APIC.

6. The method of claim 1, further comprising:
tracking the number of acknowledgements received from the components identified by the identification information until all of the identified components acknowledge the TLB shootdown request; and
completing, by the first processor core, the TLB shootdown request upon receiving acknowledgments from all of the components identified by the identification information.

7. A system for directing and tracking translation lookaside buffer (TLB) shootdowns within hardware, the system comprising:
one or more processors, each processor comprising one or more processor cores, wherein the one or more processors are configured to:
determine that a process executing on a first processing core causes one or more virtual memory pages to become disassociated with one or more previously associated physical memory addresses;
generate a TLB shootdown request; and
transmit the TLB shootdown request to others of the one or more processing cores, the TLB shootdown request comprising:
a shootdown address indicating the disassociated virtual memory page or pages to be flushed from the respective TLBs of the other processing cores,
a notification address indicating where the other processing cores may acknowledge completion of the TLB shootdown request, and
identification information, wherein the identification information comprises an identifier for components including one or more advanced programmable interrupt controller IDs (APICIDs), one or more virtual processor IDs (VPIDs), and one or more a process-context identifiers (PCIDs), wherein the components comprise one or more of a VM, a VCPU within the VM, a processor core, and a process executed within a VCPU or processor core.

8. The system of claim 7, wherein the one or more processors are configured receive acknowledgments from the other processing cores upon their completion of the TLB shootdown request, wherein the acknowledgements are received at the notification address.

9. The system of claim 7, wherein the one or more processors are configured to execute one or more virtual machines, wherein the virtual machines include one or more virtual computer processors (VCPUs), and the process is a first process executing in the one or more VCPUs.

10. The system of claim 7 further comprising a power management unit, wherein the power management unit is configured to determine whether a second core which received the TLB shootdown request is in a low power state, and in the event the second core is in a low power state, acknowledging the TLB shootdown request by the power management unit.

11. The system of claim 7, further comprising an advanced programmable interrupt controller (APIC), wherein the APIC is configured to determine whether a second core which received the TLB shootdown request is in a low power state, and in the event the second core is in a low power state, acknowledging the TLB shootdown request by the APIC.

12. The system of claim 7, wherein the wherein the one or more processors are configured to track the number of acknowledgements received from the components identified by the identification information until all of the identified components acknowledge the TLB shootdown request; and
complete the TLB shootdown request upon receiving acknowledgments from all of the components identified by the identification information.

13. A non-transitory computer readable medium on which instructions are stored, the instructions, when executed by one or more processors, each processor comprising one or more processor cores, cause the one or more processors to perform a method directing and tracking translation lookaside buffer (TLB) shootdowns within hardware, the method comprising:
determining that a process executing on a first processing core causes one or more virtual memory pages to become disassociated with one or more previously associated physical memory addresses;
generating a TLB shootdown request;
transmitting the TLB shootdown request to others of the one or more processing cores, the TLB shootdown request comprising:
a shootdown address indicating the disassociated virtual memory page or pages to be flushed from the respective TLBs of the other processing cores,
a notification address indicating where the other processing cores may acknowledge completion of the TLB shootdown request, and
identification information, wherein the identification information comprises an identifier for components including one or more advanced programmable interrupt controller IDs (APICIDs), one or more virtual processor IDs (VPIDs), and one or more a process-context identifiers (PCIDs), wherein the components comprise one or more of a VM, a VCPU within the VM, a processor core, and a process executed within a VCPU or processor core.

14. The non-transitory computer readable medium of claim 13, wherein the method further comprises receiving acknowledgments from the other processing cores upon their completion of the TLB shootdown request, wherein the acknowledgements are received at the notification address.

15. The non-transitory computer readable medium of claim 13, wherein the method further comprises, in the event a second core is in a low power state, receiving an acknowledgement of the TLB shootdown request from a power management unit.

16. The non-transitory computer readable medium of claim 13, wherein the method further comprises, in the event a second core is in a low power state, receiving an acknowledgement of the TLB shootdown request from an advanced programmable interrupt controller (APIC).

17. The non-transitory computer readable medium of claim 13, wherein the method further comprises tracking the number of acknowledgements received from the components identified by the identification information until all of the identified components acknowledge the TLB shootdown request; and completing the TLB shootdown request upon receiving acknowledgments from all of the components identified by the identification information.

\* \* \* \* \*